United States Patent
Wydra et al.

(10) Patent No.: US 7,306,639 B2
(45) Date of Patent: Dec. 11, 2007

(54) DEMISTING CHAMBER WITH ELBOW STRAINER

(75) Inventors: Larry David Wydra, Plymouth, MN (US); Michael T. Basham, Maple Grove, MN (US)

(73) Assignee: Tennant Company, Minneapolis, MN (US)

(*) Notice: Subject to any disclaimer, the term of this patent is extended or adjusted under 35 U.S.C. 154(b) by 339 days.

(21) Appl. No.: 10/964,511

(22) Filed: Oct. 13, 2004

(65) Prior Publication Data

US 2005/0172583 A1 Aug. 11, 2005

Related U.S. Application Data

(60) Provisional application No. 60/511,032, filed on Oct. 14, 2003.

(51) Int. Cl.
 *B01D 50/00* (2006.01)
(52) U.S. Cl. .............. 55/318; 55/315; 95/269; 95/286; 95/287
(58) Field of Classification Search ......... 55/185, 55/315, 318, 369, 385, 434, 439, 440, 462, 55/459.3, 459.5, 461, 443; 95/214, 267, 95/269, 271, 272; 96/188, 189, 190, 191, 96/220; 210/212.1, 512.2
See application file for complete search history.

(56) References Cited

U.S. PATENT DOCUMENTS

| | | | |
|---|---|---|---|
| 1,754,126 A | | 4/1930 | Stievenart |
| 2,474,695 A | | 6/1949 | Schneible et al. |
| 3,850,816 A | * | 11/1974 | Koch ............ 210/512.1 |
| 3,924,901 A | | 12/1975 | Phillips |
| 3,953,184 A | * | 4/1976 | Stockford et al. ....... 55/458 |
| 4,212,659 A | * | 7/1980 | Magrini ............ 55/385.3 |
| 4,344,843 A | * | 8/1982 | Leifeld ............. 209/143 |
| 4,600,410 A | * | 7/1986 | Baillie et al. .......... 95/269 |
| 5,248,421 A | * | 9/1993 | Robertson ......... 210/512.1 |
| 5,314,529 A | * | 5/1994 | Tilton et al. ........... 96/204 |
| 2004/0226879 A1 | | 11/2004 | Redding |

* cited by examiner

*Primary Examiner*—Duane Smith
*Assistant Examiner*—Sonji Turner
(74) *Attorney, Agent, or Firm*—Altera Law Group, LLC

(57) ABSTRACT

A structure and method of removing semi-rigid debris and demisting gas for use primarily in surface maintenance or conditioning machines, Demisting is accomplished by, a combination techniques including rapid pressure reduction and removal of semi rigid debris is accomplished by forcing the debris through a path with curvatures to great for the debris to follow.

15 Claims, 8 Drawing Sheets

DEMISTING CHAMBER WITH ELBOW STRAINER

Applicants claim benefit of a provisional Application No. 60/511,032 filed Oct. 14, 2003.

FIELD OF THE INVENTION

The present invention relates generally to surface maintenance or conditioning machines, and particularly those machines employing one or more surface maintenance or conditioning appliances or tools that perform one or more tasks including, among others, scrubbing, sweeping and vacuuming. More specifically, the present invention is particularly directed to a demister or deaerator, an integral component of a spent solution recovery system.

BACKGROUND OF THE INVENTION

Brush-type-scrubbing systems and appliances are commercially available and are often used for surface maintenance, typically for floor surfaces. However, in some high demand or difficult surface maintenance applications and environments, brush-type-scrubbing systems may be inadequate. Examples of high demand or difficult cleaning applications, particularly those with irregular surfaces or those that must be made particularly clean, include parking garages, gas stations, airport runways and aircraft carrier decks, among others.

These high-demand applications are well served by pressure washers or water blasting or washing systems. These are well known, and are commercially available from many manufacturers.

Schematically, a pressure washer system typically consists of a high-pressure pump system that delivers a cleaning solution to the surface to be cleaned, and a vacuum system that removes the cleaning solution along with debris cleaned from the surface. In addition, the washer system either employs large tanks for the cleaning solution or a recovery system that recycles the cleaning solution.

The input to the recovery system is a combination of cleaning liquid, solid particles, and air. The liquid is returned to the cleaning solution tank, the solids are filtered out and disposed of (usually after passage through the demister), and the air is vented out of the system. The process of separating the air from liquid is called demisting.

A well-known category of demister called a "cyclone separator", or hydrocyclone, uses centripetal acceleration to separate the air from the liquid and solids. The cyclone separator is based on the same principle as a centrifuge—a mixture of materials is spun, and the materials separate according to their densities. In a cyclone separator, a stream consisting of a combination of liquid, solid particles and air is injected into a roughly cylindrical or conical container along a direction tangent to the inner container wall, so that the stream traces out a roughly circular path along the interior wall of the container. Because the stream moves along a curved path, it is subject to a centripetal acceleration, equal to the velocity squared divided by the radius of the container. While the stream is spinning, the liquid and solids are forced to the outside of the container, and the air molecules, which are far less dense than the liquid or solids, are forced toward the center of the container. The air is vented or pumped out of the top of the container, and the liquid and solids drain out the bottom under the influence of gravity or may be pumped out. The ideal shape for a cyclone separator is tall and thin, so that the stream makes several passes around the circumference of the container before it exits. Virtually all standard hydrocyclone designs are tall and thin. The input stream enters at the top of a cylindrical structure with a conical bottom, and drains out the bottom of the cone. There are no internal features inside the container in a standard hydrocyclone design.

Note that the fundamental principle at work in a cyclone separator is that gases "rise" in a liquid, much like bubbles float to the top of a lake. For a cyclone separator, the acceleration imparted by the container wall has the same effect as gravity in a lake, and any air bubbles will "float" toward the center of the container.

Hydrocyclone designs have become standardized over the years. Each design may be scaled up or down, and predictions of performance versus changes in input variables are performed fairly readily for such scaled versions of the well-documented designs. A common design is the Stairmand design (see "The Design And Performance Of Cyclone Separators," Trans. I. Chem. E., 29, 356-383), in which the top-to-bottom height of the hydrocyclone container is four times its diameter. Another common design is the Rietema design (see Chem. Eng. Sci. 1961, 15, 198-325), in which the top-to-bottom height is five times the diameter of the container.

Unfortunately, the height required by a cyclone separator may be its biggest drawback for certain applications. For example, a truck that cleans airport or aircraft carrier runways may be required to drive underneath airplane wings, thereby limiting the maximum height of the truck and all of its cleaning subsystems. Or, a truck that cleans parking garages may be limited by the clearance of each story of the garage. A typical cyclone separator might require 1 meter of vertical space, which could raise the vehicle height by 1.5 meters. On an aircraft carrier, for example, the vehicle would be too tall to pass under the wings of an aircraft, making its use impractical.

This invention relates to a method and apparatus for demisting a gaseous stream, and more particularly to the separation of moisture and solid materials from gaseous streams through use of a demisting chamber with dimensions significantly smaller than a comparable cyclone separator.

SUMMARY

The invention has many aspects. This summary merely highlights some of these to assist the reader in further reading of the entire specification and claims.

According to one aspect of the invention, there is found a method of demisting a volume of moving gas containing liquid comprising the steps of: admitting mist comprising gas containing liquid into a first space bounded by substantially circularly curved walls defining a maximal diameter, said first space having a predetermined cross sectional area, conducting the mist into a second space having substantially circularly curved walls but of a declining diameter relative to said first space while maintaining substantially the same cross sectional area of said first space, conducting said mist to traverse said first and second spaces until it has made at least a half-circle, conducting said mist to a third space of increasing cross sectional area relative to said second space; guiding said mist into a forth space of further increased cross sectional area relative to said third space, partially impeding the passage of said mist by conducting it through a semi porous baffle; and withdrawing said gas and liquids now separated through separate ports. The method may have fewer than all of these steps and still perform the invention. This is just a representative summary of the method.

The invention may also be an apparatus. One such inventive combination would be an apparatus for demisting a volume of moving gas containing liquid comprising a fluid path having a first space bounded by substantially circularly curved walls defining a maximal diameter, said first space having a predetermined cross sectional area; a second space in fluid communication with said first space, having substantially circularly curved walls but of a declining diameter relative to said first space but with substantially the same cross sectional area of said first space; said second space comprising at least a 180 degree path; a third space of increasing cross sectional area relative to said second space and in fluid communication with said second space; a fourth space of further increased cross sectional area relative to said third space in fluid communication with said third space; a semi porous baffle interposed in said forth space and in said fluid path; and separate withdrawal ports for gas and liquid removal. Of course this is only a representative apparatus claim and the invention may have fewer elements.

DETAILED DESCRIPTION OF THE INVENTION

Figure 1:
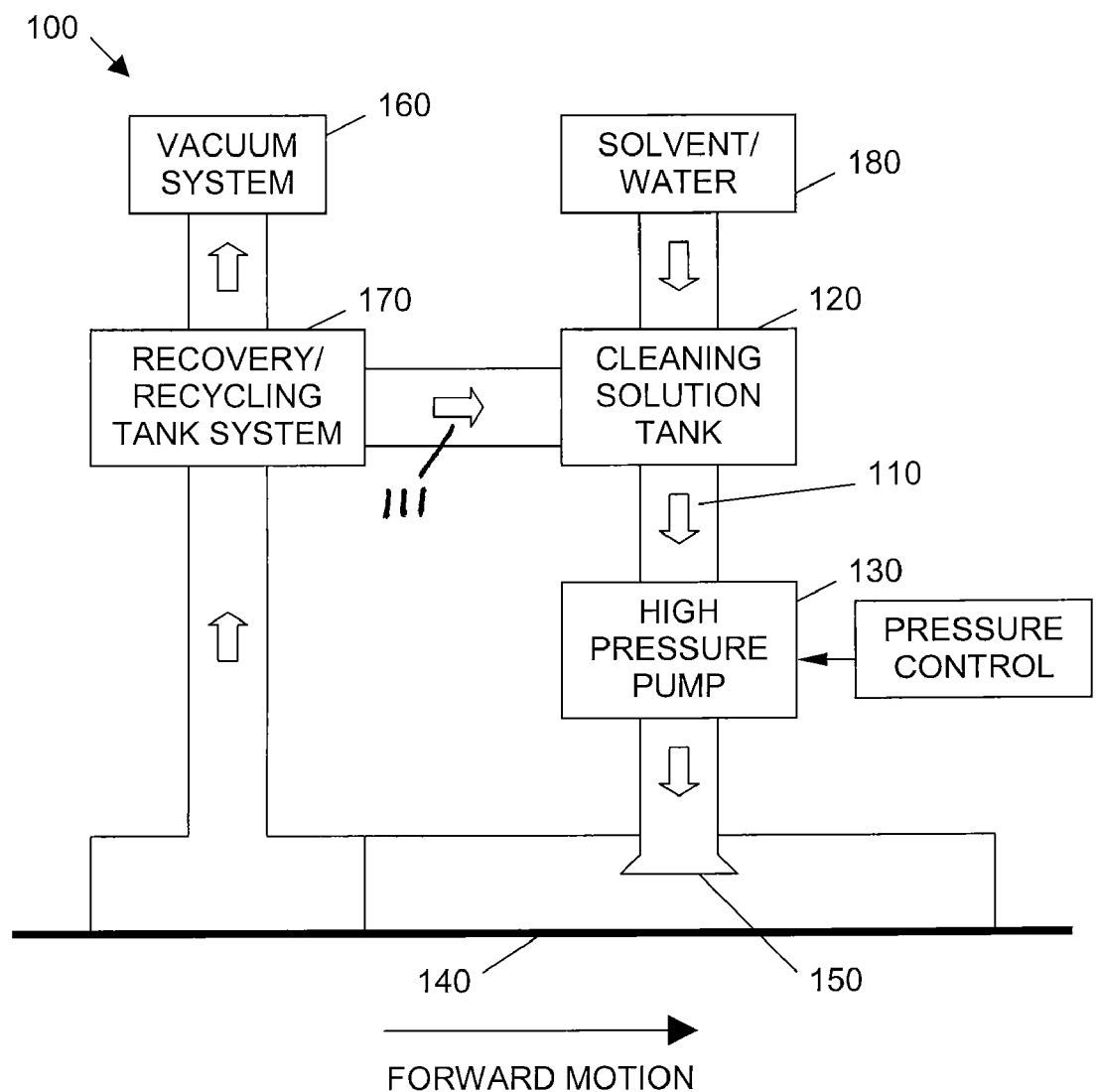
FIG. 1 is a block diagram of a pressure washer system, utilizing the present invention.

Illustrated in FIG. 1 is a block diagram of a pressure washer system 100 in accordance with the present invention. A quantity of cleaning solution 110, stored in tank 120, may be pressurized by high-pressure pump 130 and may be directed at the surface 140 to be cleaned by a nozzle 150. The nozzle 150 can be a simple nozzle, or can be a more complicated subassembly with moving parts and multiple nozzles, for example. The pressurized cleaning solution interacts with the surface 140 and knocks loose any debris that might be present on it. As the washer system 100 moves in the forward direction shown in FIG. 1, the combination of air, cleaning solution 110 and debris from the surface 140 may be directed into the recovery/recycling tank system 170 by the vacuum system 160. The air may be vented from the system, the debris may be collected for disposal, and the recycled cleaning solution 111 may be returned to the cleaning solution tank 120. A separate tank 180 containing a solvent or water may top off the cleaning solution tank 120.

Figure 2:
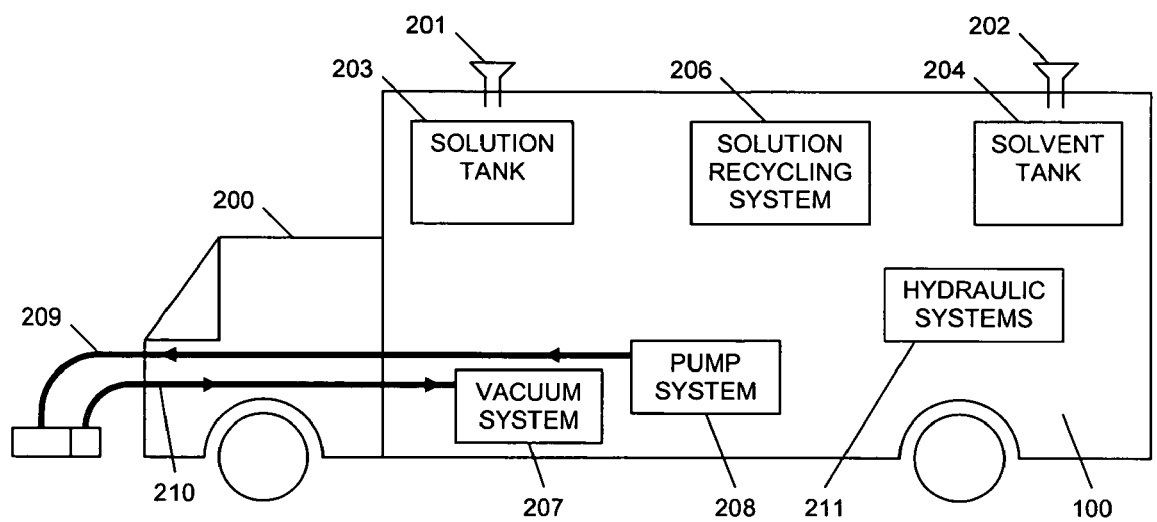
FIG. 2 is a side view of a surface maintenance vehicle, utilizing a pressure washer system that contains the present invention.

FIG. 2 shows how the pressure washer system 100 may be implemented on a surface maintenance vehicle 200. The surface maintenance vehicle 200 may include, among other components and systems, a solution inlet 201, a solvent inlet 202, a solution tank 203, a solvent tank 204 and a solution recycling system 206, a vacuum system 207, a pumping system 208 for a pressurized spray cleaning system, a solution delivery system 209, a recovered solution transport system 210, a hydraulic system 211 and requisite piping and valves, well known in the art and not shown, to enable a variety of system configurations. Alternative embodiments of surface maintenance vehicles may also be used to practice aspects of the present invention.

Figure 3:
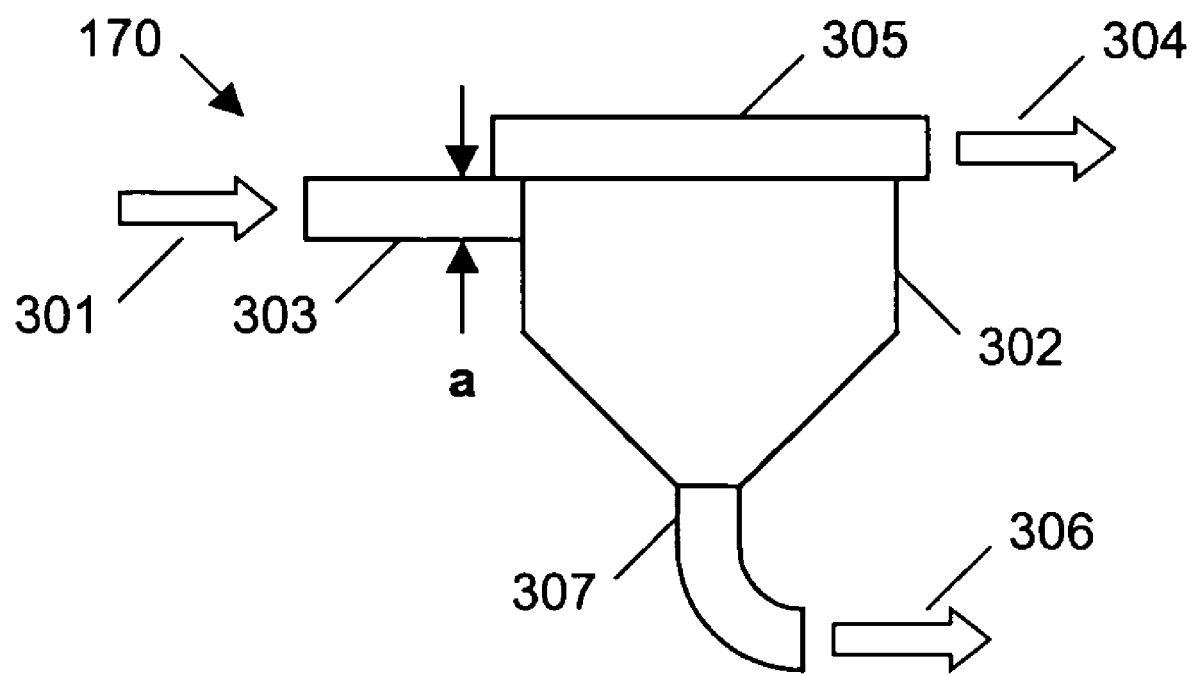
FIG. 3 is a side schematic diagram of a demisting chamber, shown as a side view.

FIG. 3 shows a schematic side view of a recovery/recycling tank system 170. A stream 301 containing air, liquid and solid particles exits the vacuum system 160 (see FIG. 1) and enters the demisting chamber 302 through an input duct 303. The dimension of the input duct 303 is a. The air collects in the center of the demisting chamber 302 and exits through a vent 305 in the top of the chamber. The exiting air 304 may either vent freely to the atmosphere, or may be removed from the chamber by a pump, not shown. The stream 306, consisting of liquid and solid particles only, exits the bottom of the chamber though a drain 307. The stream 306 may either exit the chamber under the influence of gravity, or by a pump, not shown. In general, it is desirable to keep the profile of the chamber as low as possible. Consequently the height of the cylindrical portion of the sidewall will be less than the diameter of the chamber, unlike prior art devices.

Figure 4:
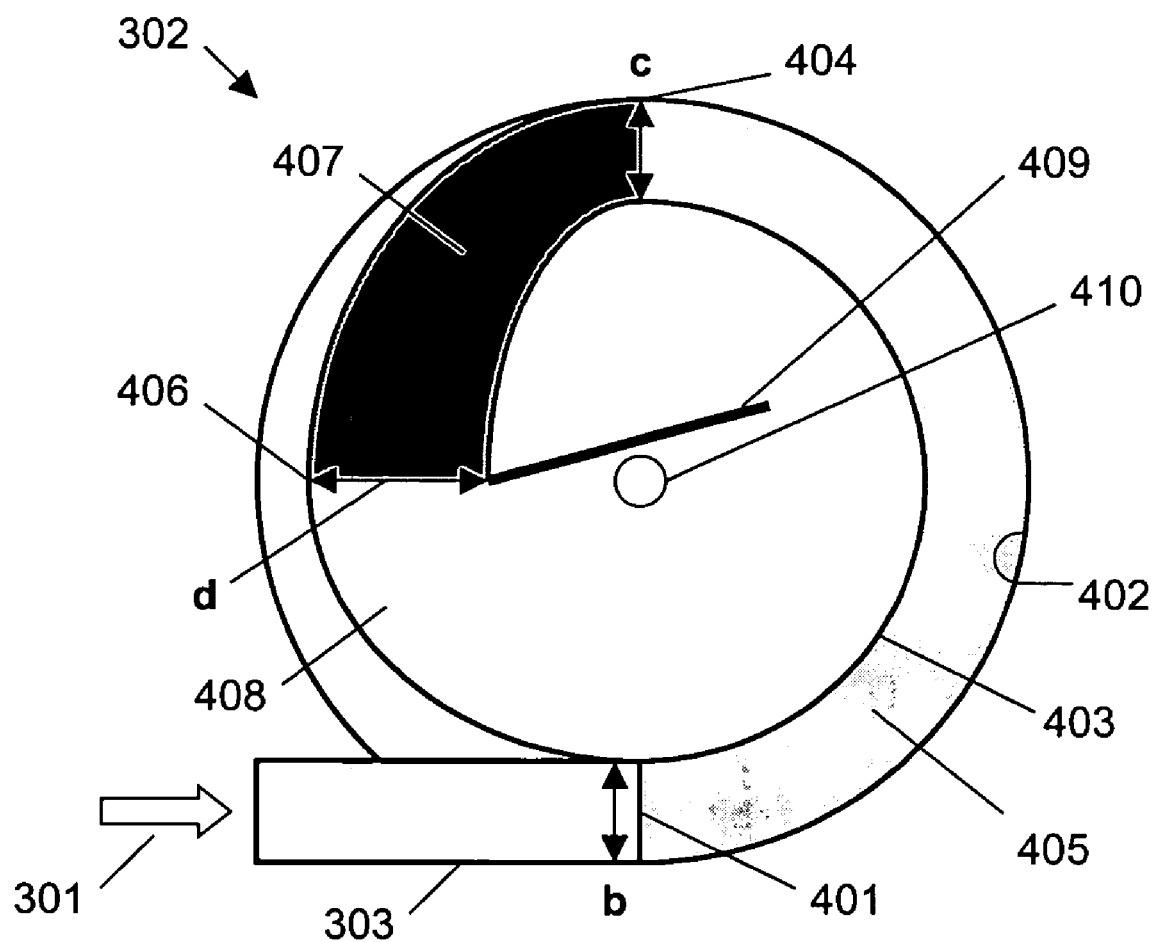
FIG. 4 is a top schematic diagram of a demisting chamber, shown as a top view with the cover and air vent removed.

FIG. 4 shows a schematic top view of a demisting chamber 302. A stream 301 containing air, liquid and solid particles exits the vacuum system 160 (see FIG. 1) and enters the demisting chamber 302 through an input duct 303. The dimension of the input duct 303 in this direction is b.

Note that it is desirable to have dimension b as small as possible, compared to dimension a (see FIG. 3) providing preferably a low profile rectangular entry port. This reduces the radial size of the stream, and reduces the required settling time of the device. Put another way, the smaller the dimension b, the less time required for a certain percentage of separation between the air and the liquid, and the more efficient the device. The preferred shape of the input duct is rectangular, although any other shape will work.

In a typical installation at the exit 401 of the input duct 303, the stream 301 may be moving at a relatively high velocity, with typical speeds of roughly 10-20 meters per second. The stream is directed in a roughly circular motion by the inner wall 402 of the container. Concentric to the inner wall 402 of the container is the channel wall 403. At the exit 401 of the input duct, the distance between the inner wall 402 of the container and the channel wall 403 is roughly b and preferably unchanged throughout the this first portion of the passage. Thus the predetermined maximal volume of the first space preferably is uniform. This first space follow approximately on-half revolution/180 degrees, but it may be shortened or lengthened by adapting other parameters.

At a point 404, approximately diametrically opposed to the input duct 303, the distance between the inner wall 402 of the container and the channel wall 403 is c, where c is roughly equal to b. Consider a first region 405 of the chamber in which the stream 301 traverses its first half-circle inside the chamber, between the exit 401 of the input duct 303 and the point 404 diametrically opposed to the input duct 303. The cross-sectional area of the first region 405 is approximately equal at all points; the function of first region 405 is to direct the stream 301 along a curved path, which separates the gas from the liquid and solid particles, while maintaining a roughly constant cross-sectional area for the stream 301. In addition, the channel and chamber walls are as smooth as possible, in order to preserve the high velocity of the stream 301.

The effectiveness of the separation depends on the acceleration of the stream that is imparted by the demisting chamber inner wall 402. The value of the centripetal acceleration acc is given by the equation $$acc = v^2/r,$$

where v is the velocity of the stream, and r is the radius of the demisting chamber 302. Typical values of velocity v and radius r may be 15 meters per second and 0.5 meters, respectively. This leads to a typical acceleration acc of 450 meters per second squared, or 46 times the effect of gravity. Clearly, a high stream velocity is desirable in the first region 405.

Consider a second region 407 of the channel between point 404 and a point 406 roughly one quarter turn more/90 degrees farther along the channel. The distance between the inner wall 402 of the container and the channel wall 403 is c as the stream 301 enters the second region 407, and is d as the stream exits the second region 407. Distance d is greater than distance c, so that the cross-sectional area of the channel progressively increases over the entire second region 407. This is accomplished by either reducing the radius of the inner wall, or reducing the radius of both walls, with the inner wall radius being reduced more rapidly. The air in the stream, which has been separated from the solid particles and liquid in the first region 405, slows down as the stream progresses through the second region 407. A typical velocity of air exiting the second region may be roughly 4 meters per second. The solid particles and liquid do not change velocity appreciably, and are slowed negligibly by friction. The sides of the inner walls of the demisting chamber 302 are preferably smooth so that water moves along the walls in sheets or streams without breaking away.

The principle behind the slowing of the air in the second region 407 is the conservation of volume flux, which states that for a steady, incompressible flow, the speed of flow varies inversely with the cross-sectional area. As the channel becomes wider, the air velocity becomes proportionately smaller. As the air slows, it becomes more difficult for the air to entrain new water droplets, which maintains the efficiency of the separation between the air and the residual liquid and solid particles.

In addition, the water, being denser, has greater momentum than the air. It will decelerate much more slowly than the air, which is sensitive to pressure changes. Thus, the water will tend to quickly collect on the walls of the demister. This is a secondary effect.

Consider a third region 408, which is comprised of the region of the demisting chamber 302 not already contained in the first region 405 and the second region 407. It may be a substantially open space bounded only by outer walls 403. Here is shown as having a pathway of ¾ turn, but it may of other dimension. The stream 301, consisting of liquid and solid particles, makes one complete revolution inside the third region 408, then encounters a weir or baffle plate 409 with several holes, then exits the system through a drain 410 at the base of the demisting chamber 302. The weir 409 is inserted, preferably orthogonally relative to the gas flow, to prevent the formation of or break up a vortex at the drain, which would allow air to be sucked into the liquid and solid particle discharge from the demister.

It is preferred that the weir 409 have holes in it in order to prevent splashing, which reintroduces liquid into the exiting air stream. The optimum ratio of voids to the total surface area of the weir is generally 10-80%, preferably 50%. The bottom surface of the weir may be wedge or v-shaped to conform to the v-shaped floor of the chamber (see FIG. 7).

The bottom of the third region 408, which could also be called a fourth space may contain standing liquid, which may be used as a reservoir to recycle and replace any liquid lost in the rest of the pressure washer system 100. The standing liquid also helps prevent a vortex from forming at the drain 410, which would suck air into the liquid and solid particle output stream 306 and decrease the efficiency of the device. The level of the standing liquid may vary greatly, and does not appreciably affect the performance of the device. Optionally, a liquid tank may be attached near the bottom of the chamber to replenish the lost liquid, not shown. Optionally, a screen may be placed in the chamber to trap large debris that could clog the drain 410, not shown. The liquid and solid particles may be removed from the demisting chamber 302 by a pump, not shown, after the drain 410.

The air from the stream 301 may be collected by a vent 305 located at the top of the demisting chamber 302. A typical flow rate for the air in the stream 301 is roughly 0.4 cubic meters per second. Note that the stream 301 is comprised mostly of air, and a typical flow rate for the liquid and solids is only roughly 0.0008 cubic meters per second. Because the flow rate of the liquid and solids is so low, the drain 307 and associated piping may have a diameter much smaller than the container diameter. For a container diameter of 1 meter, a typical drain diameter may be 25 mm.

It is understood that the size and shape of the first, second and third regions of the demisting chamber 302 may vary, depending on manufacturing conditions and desired performance. The location of points 404 and 406 around the circumference of the demisting chamber 302 are approximate, and may be adjusted appreciably.

Figure 5:
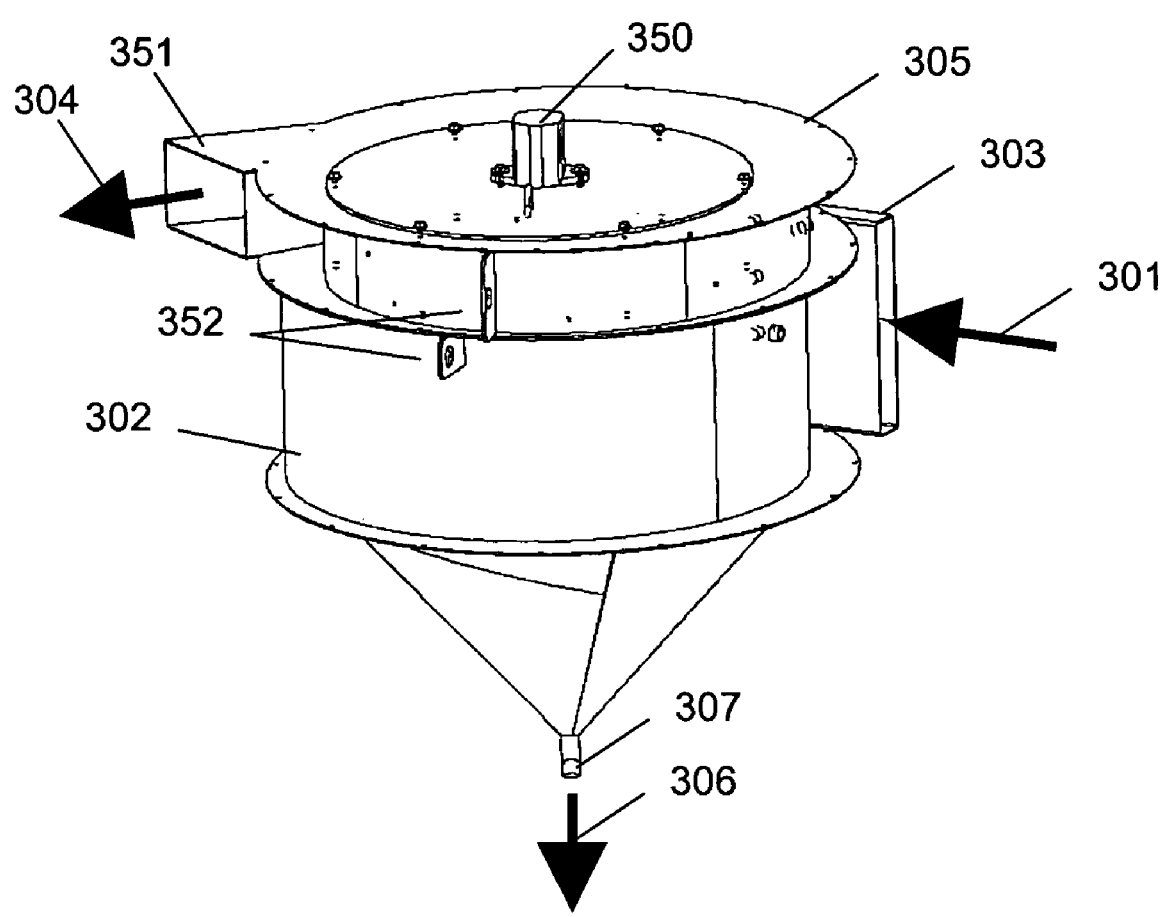
FIG. 5 shows a perspective view of a demisting chamber, mounted underneath a vent.

FIG. 5 shows a demisting chamber, mounted underneath a vent 305. A mixture 301 of gas, liquid and solid particles enters the demisting chamber 302 through an input duct 303. The stream 306 of liquid and solid particles exits the demisting chamber 302 through the drain 307. The vent may contain a fan, driven by a shaft 350, which blows the exhaust air stream 304 out of the assembly through an exiting duct 351. Various mounting brackets 352 are shown. Thus, the gas and liquids are preferably removed via separate ports, one above the other.

Figure 6:
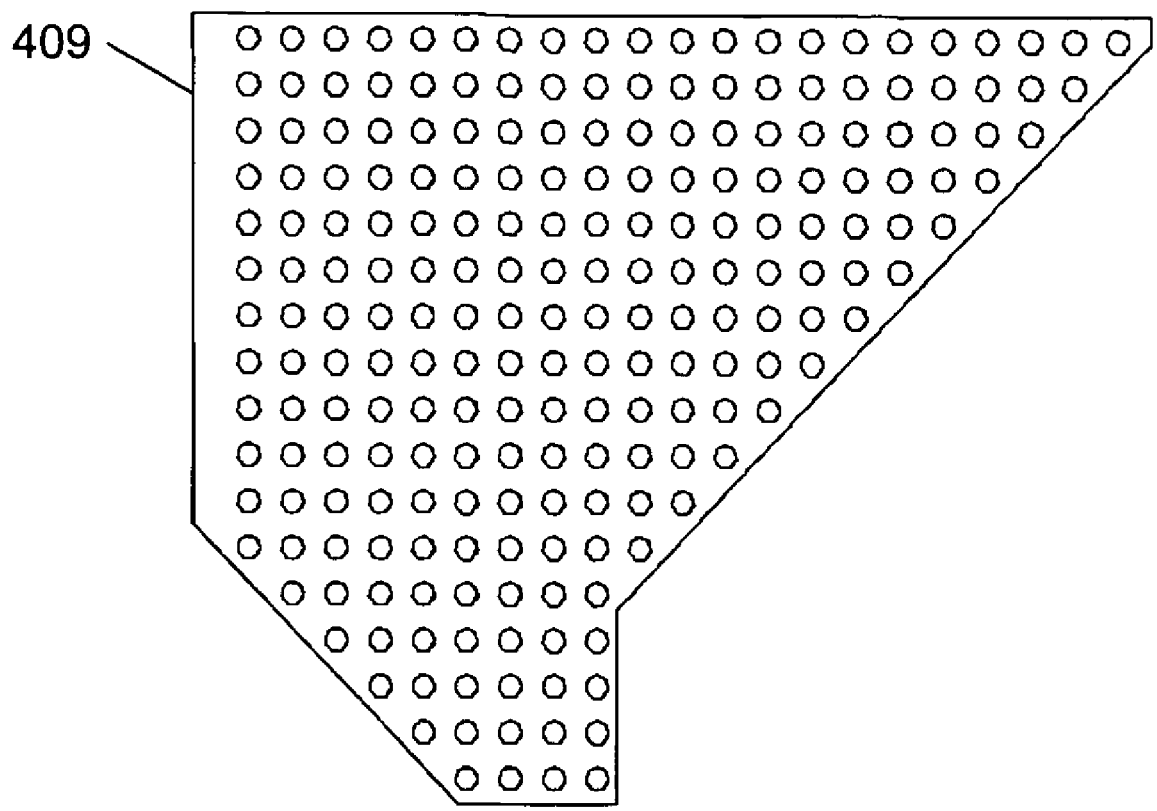
FIG. 6 shows a weir, or baffle plate.

FIG. 6 shows a weir 409. The size and shape of the holes do not appreciably affect performance, as long as the holes occupy roughly between 10% and 80% of the surface area of the weir 409.

Figure 7:
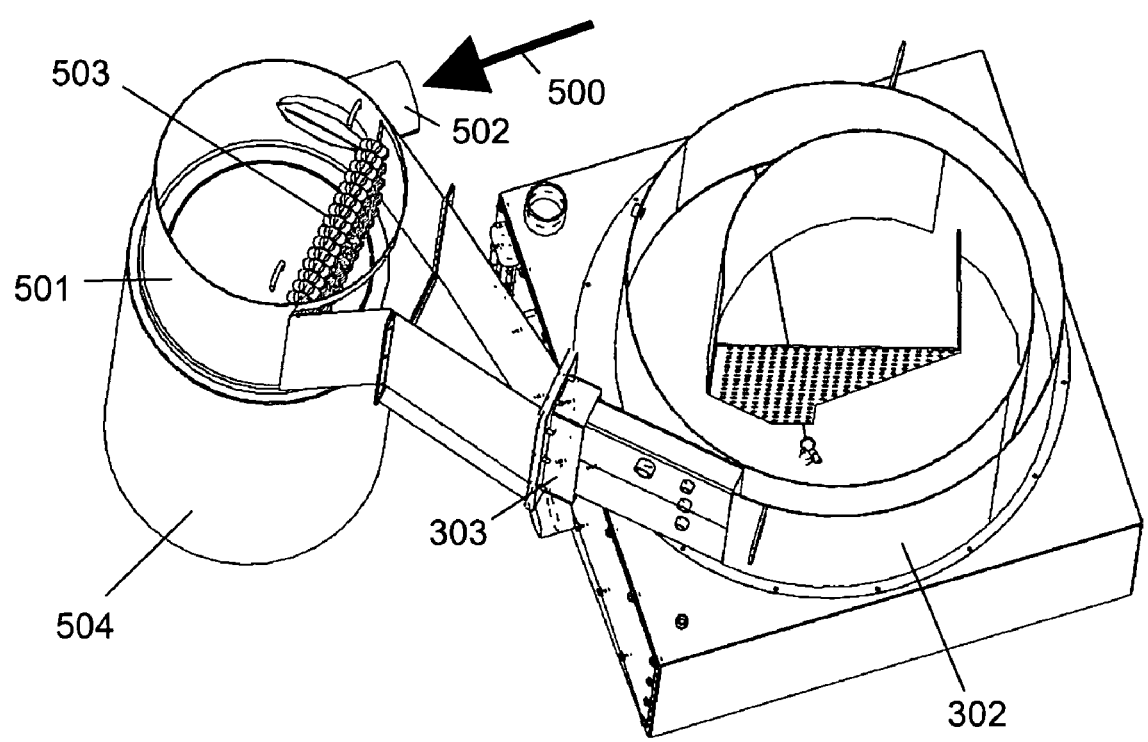
FIG. 7 shows a perspective take from above an elbow strainer attached to a demisting chamber, with their covers removed.

FIG. 7 shows a mounted demisting chamber with the vent removed, with its input assemblies. An input stream 500 of air, liquid and solid particles enters a strainer housing 501 through a duct 502. Heavy debris in the input stream falls through an opening at the bottom of the strainer housing 501 and is collected in an external container 504. The stream, now free of very heavy debris, passes through an array of elbow joints 503 before entering the demisting chamber 302 through input duct 303.

One source of solid debris common in such a cleaning system is long, largely straight and fairly rigid brush bristles from the sweeper brushes, which fly off in use. A primary filter is needed to trap these filaments without causing degradation of the throughput. Ordinary filters would potentially become quickly clogged with debris. An alternative solution has been devised.

Figure 8:
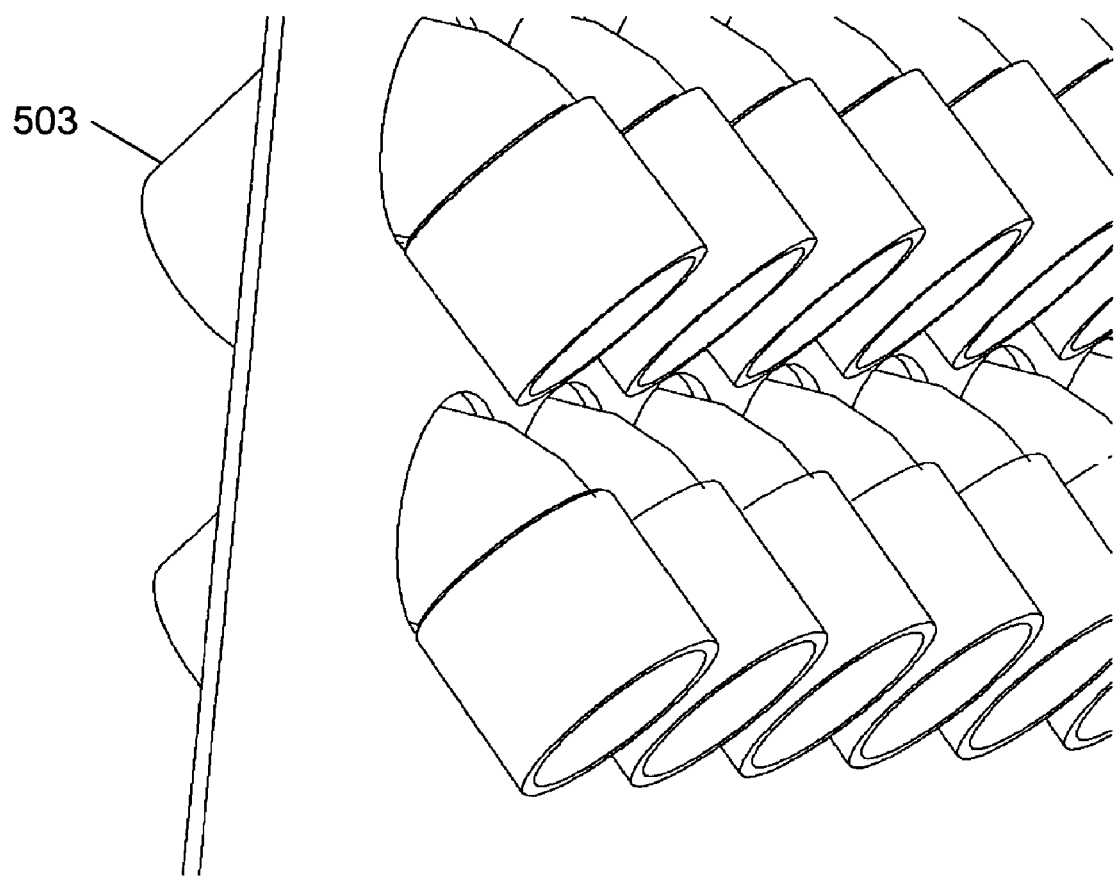
FIG. 8 shows an extreme close-up of an elbow strainer.

The array of elbow joints 503, shown in extreme close-up in FIG. 8, blocks the passage of long, inflexible objects, such as brush bristles, while permitting passage of debris smaller in diameter than each individual elbow joint, to be filtered later in the system. The diameter of each elbow joint is less than the diameter of the drain 307 in the demisting chamber, so any object that passes through the array of elbow joints 503 will not get stuck in the drain 307.

In order for the elbow joints to properly filter out long, skinny, substantially inflexible debris, it is important that each joint not have a line of sight through it. This is, if one can see through the elbow bend, end to end, even in part the filaments can get through it. Usually a 90, or 90+ degree bend in the elbow will accomplish the goal of blocking the filaments. That is not to say that line of sight is the only requirement for blocking. There is a relationship between the diameter/cross section of the passage through the elbow and the length of the fiber. If the filament/bristle is shorter than approximately twice the inside diameter (or longest inside dimension) of the opening at the bend, it will likely get through this debris filter. Thus, making the bend sharper or the intake/outlet portions of the elbow longer, so that line of sight is passage is impossible or reducing the diameter of the elbow will improve its ability to trap filaments.

The substantially rigid or inflexible bristles will enter one end of the joint, impinge against an inner surface thereof downstream and be unable to "make the bend" to exit the downstream opening, thus trapping them in the joint. Ninety degree elbow pipes of 50-150 mm diameter are useable. Various methods are available to ensure that the elbow joints do not have a line of sight through them are to extend the legs on both sides of the joint, to use a large bend radius, to turn more than 90 degrees, and so forth. While long, skinny debris is blocked by an array of these elbow joints, any approximately round particles will pass through if their largest dimension is smaller than the diameter of the elbow joint.

If the long, skinny objects have any flexibility, additional care must be taken to ensure that the elbow joints filter them out. For example, if the bend radius of the elbow joints is very large, a slightly flexible object may pass through with a slight amount of bending. This may be remedied by the same methods used for preventing a line of sight through the elbow joints, and adjustments may be made to the length of the legs on both sides of the joint, the bend radius, the total bend angle of the elbow joint, and so forth.

The array of elbow joints 503 may be fabricated by various means, including but not limited to, stacking elbows, installing elbows in a rack, machining a grid of elbows in a block, molding a bank of elbows or other means. A typical use is blockage of rotating broom bristles or fragments thereof. Such pieces are often 100 mm or longer and bendable but considered substantially rigid for this purpose. An elbow array of inside diameter of about 20 mm (¾ in) with inlet and output portions (as measured from the bed of about 25-40 mm each) is quite effective.

Removal of trapped bristles can be achieved by reverse blow back or just manual removal.

The invention claimed is:

1. A method of demisting a volume of moving gas containing liquid comprising the steps of:
   a. Admitting mist comprising gas containing liquid into a first space bounded by substantially circularly curved walls defining a maximal diameter, said first space having a predetermined cross sectional area;
   b. Conducting the mist into a second space increasing cross sectional area relative to said first space having substantially circularly curved walls throughout;
   c. Guiding said mist into a third space of further increased cross sectional area relative to said second space said third space containing as space for receiving standing liquid; and
   d. Partially impeding the creation of a vortex within said standing liquid by interposing a semi porous baffle in said standing liquid.

2. A method of demisting a volume of moving gas containing liquid comprising the steps of:
   a. Admitting mist comprising gas containing liquid into a first space bounded by substantially circularly curved walls defining a maximal diameter, said first space having a predetermined cross sectional area;
   b. Guiding said mist into a further space of further increased cross sectional area relative to said second space said further space including standing liquid;
   c. Partially impeding the creation of a vortex within said standing liquid by locating a semi porous baffle at least partway within said standing liquid; and
   d. Withdrawing said gas and liquids now separated through separate ports.

3. A method according to claim 2 wherein said impeding step includes positioning said baffle substantially orthogonally relative to the flow of the mist.

4. A method according to claim 2 wherein said impeding step includes submerging said baffle in said liquid.

5. A method according to claim 2 wherein said guiding step includes guiding said mist toward a central exit port.

6. A method of separating filament-like semi-rigid filamentary debris from a gaseous stream, comprising the steps of:
   a. Conducting said combination of debris and air toward a separation tube, said separation tube having an inlet and outlet end,
   b. Conducting said debris through the inlet end of the tube;
   c. changing the flow direction of the tube such that the flow angle is at least 90 degrees from the initial flow angle at the outlet end of the tube,
   d. Requiring all of the gaseous stream entering the inlet to exit the outlet; and
   e. Trapping said debris at the point of said changed flow angle.

7. An apparatus for separating filament-like semi-rigid filamentary debris from a gaseous stream, comprising:
   a. an inlet passage;
   b. an outlet passage; and
   c. an elbow having a fluid impervious sidewall passage having an angular portion connection between said inlet and outlet passages, said angle being such that there is no visual line of sight from said inlet to said outlet, so that passage of said debris is blocked by the angular portion.

8. An apparatus according to claim 7 wherein said passages include an array of side by side inlet, outlet and elbow passages.

9. An apparatus according to claim 7 wherein said elbow passage includes a substantially right angle bend.

10. An apparatus for demisting a volume of moving gas containing liquid comprising a fluid path and for removing semi-rigid filamentary debris comprising:
    a. an inlet passage;
    b. an outlet passage;
    c. an elbow having a fluid impervious sidewall passage having an angular portion connection said inlet and outlet passages, said angle being such that there is no visual line of sight from said inlet to said outlet, so that passage of said debris is blocked by the angular portion, d. a first space in communication with said outlet passage, said first space bounded by substantially circularly curved walls defining a maximal diameter;

e. A a further space of further increased cross sectional area relative to said first space in fluid communication therewith, said further space including standing liquid;

f. a semi porous baffle interposed in said further space and in said fluid path and at least partly submerged in said liquid; and g. withdrawal ports for gas and liquid removal.

11. An apparatus according to claim 10 wherein said apparatus includes an array of side by side elbow passages in communication with said first space.

12. An apparatus for separating filament-like semi-rigid filamentary debris from a gaseous stream, comprising:

a. an inlet passage;

b. an outlet passage; and c. an array of elbow passage having an angular portion connection between said inlet and outlet passages, said angle being such that there is no visual line of sight from said inlet to said outlet, so that passage of said debris is blocked by the angular portion.

13. An apparatus for demisting a volume of moving gas containing liquid comprising a fluid path comprising:

a. demisting chamber having an inlet and outlet, top and bottom, said chamber having:

i. a first space in communication with said inlet passage, said first space bounded by substantially circularly curved walls defining a maximal diameter;

ii. a space of increased cross sectional area relative to said first space and in fluid communication with said first space; said second including standing liquid;

iii. a semi porous baffle interposed in said second space at least partly submerged in said liquid;

so that said liquid is at least partially prevented from forming a vortex.

14. The apparatus of claim 13, wherein said second space has a v-shaped bottom and wherein said baffle plate is sized to be received, at least in part, within a liquid reservoir; so that the overall height of the demisting apparatus and said reservoir is reduced by nesting one within the other.

15. The apparatus of claim 14 wherein said baffle is v-shaped to be received within said bottom.

\* \* \* \* \*